United States Patent
Collings et al.

(10) Patent No.: US 9,378,936 B2
(45) Date of Patent: Jun. 28, 2016

(54) FAST SWITCHING, DUAL POLARITY, DUAL OUTPUT HIGH VOLTAGE POWER SUPPLY

(71) Applicant: DH Technologies Development Pte. Ltd., Singapore (SG)

(72) Inventors: Bruce Andrew Collings, Bradford (CA); Martian Daniel Dima, Richmond Hill (CA)

(73) Assignee: DH Technologies Development Pte. Ltd., Singapore (SG)

( * ) Notice: Subject to any disclaimer, the term of this patent is extended or adjusted under 35 U.S.C. 154(b) by 0 days.

(21) Appl. No.: 14/373,248

(22) PCT Filed: Jan. 16, 2013

(86) PCT No.: PCT/IB2013/000054
§ 371 (c)(1),
(2) Date: Jul. 18, 2014

(87) PCT Pub. No.: WO2013/110989
PCT Pub. Date: Aug. 1, 2013

(65) Prior Publication Data
US 2015/0001390 A1 Jan. 1, 2015

Related U.S. Application Data

(60) Provisional application No. 61/590,024, filed on Jan. 24, 2012.

(51) Int. Cl.
| | |
|---|---|
| H01J 49/00 | (2006.01) |
| H01J 49/02 | (2006.01) |
| H01J 49/26 | (2006.01) |
| H02M 1/088 | (2006.01) |
| H02M 7/10 | (2006.01) |

(52) U.S. Cl.
CPC ........... *H01J 49/022* (2013.01); *H01J 49/0027* (2013.01); *H01J 49/26* (2013.01); *H02M 1/088* (2013.01); *H02M 7/103* (2013.01)

(58) Field of Classification Search
USPC ......................................... 250/281, 282, 288
See application file for complete search history.

(56) References Cited

U.S. PATENT DOCUMENTS

| | | |
|---|---|---|
| 2008/0035842 A1 | 2/2008 | Sudakov et al. |
| 2009/0230297 A1 | 9/2009 | Mizutani |
| 2009/0294654 A1 | 12/2009 | Steiner |

FOREIGN PATENT DOCUMENTS

| | | |
|---|---|---|
| WO | 2009/037598 | 3/2009 |
| WO | 2011/138669 | 11/2011 |

OTHER PUBLICATIONS

International Search Report from International Patent Application No. PCT/IB2013/000054, dated May 31, 2013.

*Primary Examiner* — Nicole Ippolito
*Assistant Examiner* — Hanway Chang

(57) ABSTRACT

Systems, devices, circuits, and methods are provided for an improved mass spectrometry detection system that comprises an ion source and a detector that operate at opposite polarities. In some embodiments, the system can comprise a positive and negative multiplier, each of which can be configured to provide voltage to each of the ion source and the detector. In some embodiments, the system can comprise switches that allow the change between positive and negative polarities for the ion source or detector to occur quickly. A variety of embodiments of systems, devices, circuits, and methods in conjunction with the disclosures are provided.

16 Claims, 8 Drawing Sheets

FAST SWITCHING, DUAL POLARITY, DUAL OUTPUT HIGH VOLTAGE POWER SUPPLY

RELATED APPLICATIONS

This application claims the benefit and priority from U.S. Provisional Application Ser. No. 61/590,024, filed on Jan. 24, 2012, the entire contents of which are incorporated by reference herein.

FIELD

The application relates to fast switching, dual polarity and dual output voltage power supplies that are useful in mass spectrometry applications.

INTRODUCTION

The disclosure relates to systems, devices, circuits, and methods for operating a mass spectrometry detection system. Mass spectrometry systems can often include both an ion source for providing a plurality of ions and a detector for receiving and detecting ions. Typically, the ion source is powered at an opposite polarity to one or more components of the detector. For example, in embodiments in which the detector comprises a high energy conversion dynode (HED), the HED and ion source can have opposite polarities. Likewise, in embodiments in which the detector comprises a float potential, the float potential and ion source can have opposite polarities. Further, the absolute value of voltages applied to the ion source and to the detector can be generally high (in the range of about ±1 kV to about ±20 kV). In conventional systems, four power supplies are typically used to power the ion source and detector—one positive power supply for the ion source, one positive power supply for the detector, one negative power supply for the ion source, and one negative power supply for the detector. Further, additional components of circuitry in conventional systems are also component and polarity specific, such as four digital-to-analog converters being used for each of a positive ion source voltage, a negative ion source voltage, a positive detector voltage, and a negative detector voltage. As a result, conventional systems can be costly, cumbersome, and subject to failure at least because as the number of power supplies, digital-to-analog converters, and other components increases, the likelihood for errors and failure also increases. Accordingly, improved detection systems, devices, circuits, and methods are desired.

SUMMARY

The following summary is intended to introduce the reader to this specification but not to define any invention. One or more inventions may reside in a combination or sub-combination of the system and/or device elements or the method steps described below or in other parts herein. The inventors do not waive or disclaim their rights to any invention or inventions disclosed in this specification merely by not describing such other invention or inventions in the claims.

The embodiments described herein provide, in some aspects, a mass spectrometer system comprising an ion source, a detector, a positive multiplier, and a negative multiplier. The detector can be configured to receive at least a portion of ions generated by the ion source. Further, a positive multiplier can be configured to provide voltage to each of the ion source and the detector, and the negative multiplier can also be configured to provide voltage to each of the ion source and the detector. Although described as being applied to the ion source and detector generally, in some embodiments the voltage supplied by the multipliers can be supplied to one or more components of the ion source or detector. By way of non-limiting example, in some embodiments in which the detector comprises a high energy conversion dynode (HED), the voltage can be supplied to the HED. By way of further non-limiting example, in some embodiments in which the detector comprises a float potential, the voltage can be supplied for the float potential. In some embodiments, the system can comprise one or more switches for controlling application of voltage to the detector and the ion source. In some embodiments, the one or more switches can further comprise a first switch for controlling application of a positive voltage to the ion source or the detector and a second switch for controlling application of a negative voltage to the ion source or the detector. In some embodiments, the first switch can be configured to allow the positive voltage to be applied to the ion source, the second switch can be configured to allow the negative voltage to be applied to the detector, the first switch can be further configured to allow the positive voltage to be applied to the detector, and the second switch can be further configured to allow the negative voltage to be applied to the ion source. In some embodiments, the first switch can further comprise an ion source positive voltage switch and a detector positive voltage switch, while the second switch can further comprise an ion source negative voltage switch and a detector negative voltage switch. In some other embodiments the one or more switches can further comprise a first switch for controlling application of a positive voltage or a negative voltage to an ion source and a second switch for controlling application of a positive voltage or a negative voltage to a detector. In some embodiments, the first switch can be configured to allow the positive voltage to be applied to the ion source, the second switch can be configured to allow the negative voltage to be applied to the detector, the first switch can be further configured to allow the negative voltage to be applied to the ion source, and the second switch can be further configured to allow the positive voltage to be applied to the detector. In some embodiments, the first switch can comprise an ion source positive voltage switch and an ion source negative voltage switch, while the second switch can further comprise a detector positive voltage switch and a detector negative voltage switch.

In some embodiments, the one or more switches can comprise a first switch configured to allow the positive multiplier to supply a positive voltage to the ion source when the negative multiplier supplies a negative voltage to the detector, and to allow the positive multiplier to supply a positive voltage to the detector when the negative multiplier supplies a negative voltage to the ion source. In some embodiments, the first and second switches can be capable of switching a polarity of voltage supplied to the ion source and a polarity of voltage supplied to the detector in a period of time that can be less than or equal to about 1 millisecond. In some embodiments, the detector can further comprise a high energy conversion dynode. In some embodiments, the system can further comprise a mass analyzer disposed downstream of the ion source and upstream of the detector. The mass analyzer can be configured to receive the portion of ions discharged from the ion source, and further, can be configured to discharge at least a portion of ions to the detector. In some embodiments, the voltage provided by at least one of the positive multiplier and the negative multiplier can comprise a high voltage. In some embodiments, the voltage provided by at least one of the positive multiplier and the negative multiplier can be in the range of about +1 kV to about ±20 kV.

The embodiments described herein provide, in further aspects a mass spectrometer system comprising an ion source, a detector, one or more switches, and a voltage input. The detector can be configured to receive at least a portion of ions generated by the ion source. The one or more switches can be coupled to one or more power supplies. Further, the one or more switches can be configured to allow a positive voltage to be supplied to the ion source while a negative voltage is supplied to the detector, and to allow a negative voltage to be supplied to the ion source while a positive voltage is applied to the detector. Still further, the voltage input can be configured to receive voltage supplied to the ion source and the detector that can be supplied by the same power supply. In some embodiments, the positive voltage supplied to the ion source and the detector can be supplied by a first, positive multiplier, and the negative voltage supplied to the ion source and the detector can be supplied by a second, negative multiplier. Although described as being applied to the ion source and the detector generally, in some embodiments the voltage supplied by the multipliers can be supplied to one or more components of the ion source or detector. By way of non-limiting example, in some embodiments in which the detector comprises a high energy conversion dynode (HED), the voltage can be supplied to the HED. By way of further non-limiting example, in some embodiments in which the detector comprises a float potential, the voltage can be supplied for the float potential. In some embodiments, the one or more switches can further comprise a first switch for controlling application of a positive voltage to the ion source or the detector and a second switch for controlling application of a negative voltage to the ion source or the detector. In some embodiments, the first switch can be configured to allow the positive voltage to be applied to the ion source, the second switch can be configured to allow the negative voltage to be applied to the detector, the first switch can be further configured to allow the positive voltage to be applied to the detector, and the second switch can be further configured to allow the negative voltage to be applied to the ion source. In some embodiments, the first switch can further comprise an ion source positive voltage switch and a detector positive voltage switch, while the second switch can further comprise an ion source negative voltage switch and a detector negative voltage switch. In some other embodiments the one or more switches can further comprise a first switch for controlling application of a positive voltage or a negative voltage to an ion source and a second switch for controlling application of a positive voltage or a negative voltage to a detector. In some embodiments, the first switch can be configured to allow the positive voltage to be applied to the ion source, the second switch can be configured to allow the negative voltage to be applied to the detector, the first switch can be further configured to allow the negative voltage to be applied to the ion source, and the second switch can be configured to allow the positive voltage to be applied to the detector. In some embodiments, the first switch can comprise an ion source positive voltage switch and an ion source negative voltage switch, while the second switch can further comprise a detector positive voltage switch and a detector negative voltage switch.

In some embodiments, the first and second switches can be capable of switching a polarity of voltage supplied to the ion source and a polarity of voltage supplied to the detector in a period of time that can be less than or equal to about 1 millisecond. In some embodiments, the system can further comprise a positive multiplier configured to provide voltage to each of the ion source and the detector, and a negative multiplier also configured to provide voltage to each of the ion source and the detector. In some embodiments, the detector can comprise a high energy conversion dynode. In some embodiments, the system can further comprise a mass analyzer disposed downstream of the ion source and upstream of the detector. The mass analyzer can be configured to receive the portion of ions discharged from the ion source, and further, can be configured to discharge the at least a portion of ions to the detector.

The embodiments described herein provide, in yet further aspects, a method for detecting ions in a mass spectrometer, comprising operating an ion source to supply a plurality of ions, and operating a detector to detect at least some ions of the plurality of ions. A polarity of voltage supplied to the ion source can be opposite of a polarity of voltage supplied to the detector, and further, at least one of: (1) positive voltages supplied to the ion source and the detector, and (2) negative voltages supplied to the ion source and the detector can be supplied by the same power supply. Although described as being applied to the ion source and the detector generally, in some embodiments the voltage supplied to the ion source and/or the detector can be supplied to one or more components of the ion source and/or the detector. By way of non-limiting example, in some embodiments in which the detector comprises a high energy conversion dynode (HED), the voltage can be supplied to the HED. By way of further non-limiting example, in some embodiments in which the detector comprises a float potential, the voltage can be supplied for the float potential. In some embodiments, the method can further comprise switching an output of a power supply from powering the ion source to powering the detector. In some embodiments, this can further comprise switching an output of a positive power supply from powering the ion source to powering the detector, and switching an output of a negative power supply from powering the detector to powering the ion source. In some embodiments, a period of time it takes to switch a polarity of voltage supplied to the ion source and a polarity of voltage supplied to the detector can be less than or equal to about 1 millisecond. In some embodiments, the method can further comprise supplying an alternating current signal to a control system of the mass spectrometer, operating a multiplier to convert the alternating current signal to a first direct current signal, operating a comparator to compare the alternating current signal prior to conversion to the first direct current signal and to a second direct current signal, and operating the comparator to adjust an amount of the alternating current supplied to the multiplier based on comparisons made by the comparator. In some embodiments, the method can further comprise operating a mass analyzer to selectively discharge the at least some ions of the plurality of ions to the detector. In some embodiments, the method can further comprise operating a microcontroller to switch the polarity of voltage supplied to the ion source and the polarity of voltage supplied to the detector.

These and other features of the applicants' teachings are set forth herein.

BRIEF DESCRIPTION OF DRAWINGS

The skilled person in the art will understand that the drawings, described below, are for illustration purposes only. The drawings are not intended to limit the scope of the applicant's teachings in any way. This invention will be more fully understood from the following description of various embodiments taken in conjunction with the accompanying drawings, in which:

FIG. 4D is a schematic representation of a fourth portion of a circuit according to some embodiments of the applicants' teachings.

DESCRIPTION OF VARIOUS EMBODIMENTS

Certain exemplary embodiments will now be described to provide an overall understanding of the principles of the structure, function, manufacture, and use of the systems, devices, circuits, and methods disclosed herein. One or more examples of these embodiments are illustrated in the accompanying drawings. Those skilled in the art will understand that the systems, devices, circuits, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the systems, devices, circuits, and methods described herein.

Figure 1:
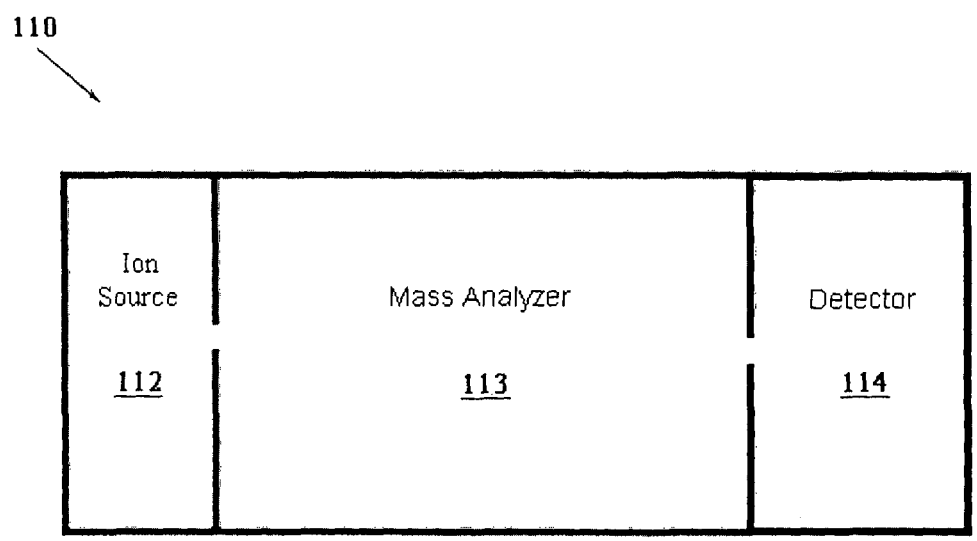
FIG. 1 is a schematic representation of a mass spectrometer in accordance with some embodiments of the applicants' teachings.

While the systems, devices, circuits, and methods described herein can be used in conjunction with many different mass spectrometry systems, a general diagram of a mass spectrometry system is illustrated in FIG. 1 to provide a general framework for describing various embodiments of the applicants' teachings. As shown, in some embodiments, a mass spectrometer 110 can comprise an ion source 112, a mass analyzer 113, and a detector 114. The ion source 112 can emit ions that pass through the mass analyzer 113, which allows certain ions of those ions, e.g., ions having a mass-to-charge ratio (m/z ratio) in a selected range, to pass to the detector 114.

The components of the mass spectrometer 110, including the ion source 112, the mass analyzer 113, and the detector 114, can be powered for operation by one or more power supplies (not shown). Each of the ion source 112, mass analyzer 113, and detector 114 can likewise comprise multiple components. By way of non-limiting example, in some embodiments the detector can comprise a high energy conversion dynode (HED), and in some embodiments the detector can comprise a float potential. In some embodiments, a polarity of the voltage applied to the ion source 112 can be opposite to a polarity of voltage applied to the detector 114, or components of the detector 114, such as the non-limiting examples of an HED or a float potential. For example, in some embodiments, for a positive ion mode, a positive voltage can be applied to the ion source and a negative voltage can be applied to the detector, and for a negative ion mode, a negative voltage can be applied to the ion source and a positive voltage can be applied to the detector. In some embodiments, a voltage applied to the ion source 112 can be in the range of about ±2 kV to about ±10 kV, for example about +6 kV for a positive voltage and about −4.8 kV for a negative voltage, and a voltage applied to the detector 114 can be in the range of about ±1 kV to about ±20 kV, for example about +12.5 kV for a positive voltage and about −12.5 kV for a negative voltage, with the polarity of the voltage applied to the ion source being opposite of the polarity of the voltage applied to the detector. While a number of different circuits can be used to power these components, the embodiment shown in FIG. 2, which is further elaborated upon in FIGS. 3 and 4A-4D, illustrates some components of circuits that can be used to power and control the ion source 112 and the detector 114.

Figure 2:
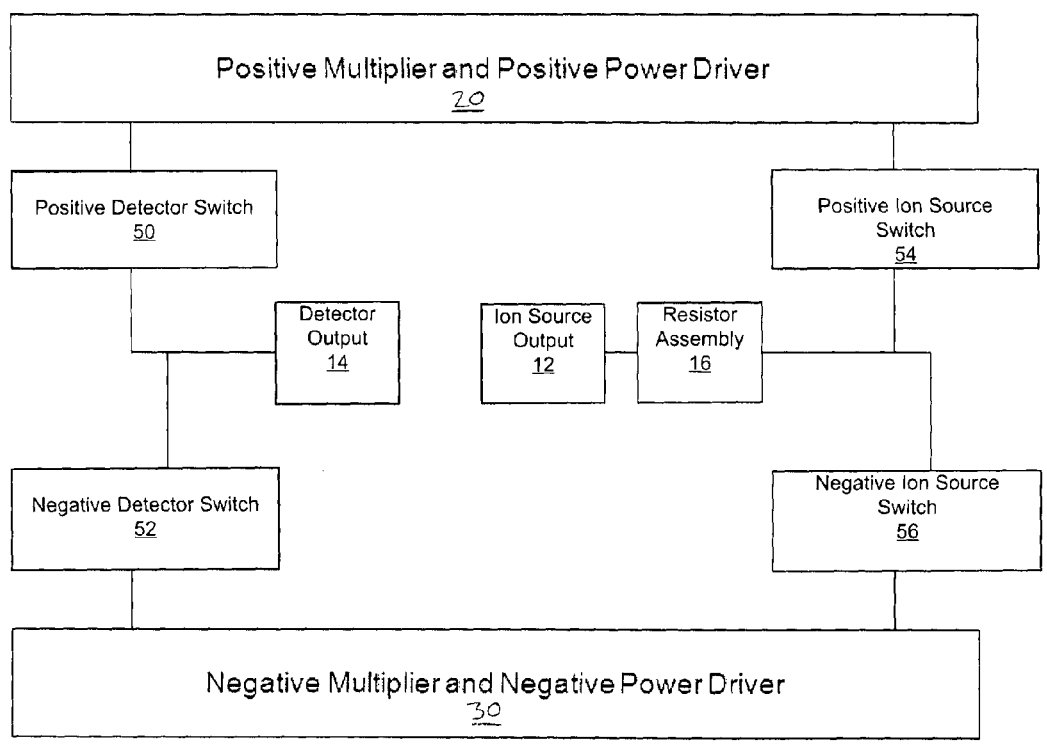
FIG. 2 is a block diagram of a circuit according to some embodiments of the applicants' teachings.

As shown in FIG. 2, in some embodiments a circuit 10 for powering an ion source 12 and a HED 14 can comprise a positive power supply 20, a negative power supply 30, and one or more switches 50, 52, 54, 56 for selectively providing positive or negative voltage to the HED 14 and ion source 12. In some embodiments, other types of detectors can also be used in conjunction with circuit 10, either in lieu of or in conjunction with the HED 14. For instance, by way of the illustrated, non-limiting example, a detector that comprises one or more float potentials, as shown a positive detector float output 7 and a negative detector float output 9, can be used in conjunction with the HED output 14. In some other embodiments, only one type of detector, such as the HED 14 or a detector comprising one or more float potentials 7, 9, can be used as part of the circuit 10. Use of the term HED in the present application in no way limits the type of detector(s) that can be used in conjunction with applicants' teachings.

In some embodiments, a microcontroller (not shown) can be electrically connected to the circuit 10 and can be configured to control the various components of the circuit 10, including but not limited to the power supplies 20, 30 and switches 50, 52, 54, 56. The positive power supply 20 can comprise, in some embodiments, a positive multiplier 24 and positive power driver 22 (shown in FIGS. 3 and 4C), and the negative power supply 30 can comprise, in some embodiments, a negative multiplier 34 and negative power driver 32 (shown in FIGS. 3 and 4D). In some embodiments, the positive and negative power drivers 22, 32 can be configured to drive the multipliers 24, 34 and/or amplify an alternating current passing across the drivers 22, 32, while in some embodiments, the positive and negative multipliers 24, 34 can be configured to convert the alternating current passed from the drivers 22, 32 to a direct current and/or amplify the current passing across the multipliers 24, 34.

The one or more switches 50, 52, 54, 56 can be actuated into a number of different configurations to selectively allow positive or negative voltages to be supplied to the HED 14 and ion source 12. As shown, in some embodiments a separate switch can be provided for each of the four power states: a positive HED switch 50 for allowing a positive voltage to be supplied to the HED 14, a negative HED switch 52 for allowing a negative voltage to be supplied to the HED 14, a positive ion source switch 54 for allowing a positive voltage to be supplied to the ion source 12, and a negative ion source switch 56 for allowing a negative voltage to be supplied to the ion source 12. Alternatively, in some embodiments one switch can control two of the four power states, for instance a first switch can be actuated into a configuration that allows a positive voltage to be supplied to the HED 14 and a negative voltage to the HED 14, i.e., the first switch can serve as both the positive HED switch 50 and the negative HED switch 52. Similarly, in some embodiments, a second switch can be actuated into a configuration that allows a positive voltage to be supplied to the ion source 12 and a negative voltage to the ion source 12, i.e., the second switch can serve as both the positive ion source switch 54 and the negative ion source switch 56. By way of further non-limiting example, a first switch can also be actuated into a configuration that allows a positive voltage to be supplied to the HED 14 and a positive voltage to the ion source 12, i.e., the first switch can serve as both the positive HED switch 50 and the positive ion source switch 54, while a second switch can be actuated into a configuration that allows a negative voltage to be supplied to the HED 14 and a negative voltage to the ion source, i.e., the second switch can serve as both the negative HED switch 52 and the negative ion source switch 56.

The switches 50, 52, 54, 56 can be configured in a manner such that actuation of one switch to a desired on-off configuration can cause one or more of the other switches to actuate to desired on-off configurations at approximately the same time. Accordingly, in some embodiments, actuation of one of the switches, for instance the positive HED switch 50, to an on configuration can cause the negative HED switch 52 to actuate to an off configuration, and/or the positive ion source switch 54 to actuate to an off configuration, and/or the negative ion source switch 56 to actuate to an on configuration. In some embodiments, a single switch can be included as part of the circuit 10 to control each of the four switches 50, 52, 54, 56 at approximately the same time. Thus, the polarity of the HED 14 can be changed from positive to negative and the ion source 12 from negative to positive at approximately the same time by actuating a single switch to a desired on-off configuration.

The size of the voltage applied to each of the ion source 12 and the HED 14 by the power supplies 20, 30 can vary depending on a number of factors, including but not limited to the other components of the circuit 10. However, in some embodiments a voltage supplied by the multipliers 24, 34 to the HED 14 can be a high voltage in the range of about ±4 kV to about ±20 kV, for example about ±12.5 kV, and a voltage supplied by the multipliers 24, 34 to the ion source 12 can be a high voltage in the range of about ±2 kV to about ±10 kV, for example about −4.8 kV and about +6 kV, although other voltage values can be achieved, depending, at least in part, on the components of the circuit 10. The voltage resulting at the HED and ion source outputs 14, 12 can be different than the voltage supplied by the multipliers 24, 34. In some embodiments, a resistor assembly 16 can be provided between the power supplies 20, 30 and at least one of the ion source and HED outputs 12, 14, as shown the ion source output 12, to reduce, at least slightly, the value of the voltage at the ion source output 12 and to maintain an ionization discharge at the ion source output 12. Other components that can create voltage drop, or voltage gain if desired, can be included as part of the circuit 10 wired to either or both of the HED output 14 and the ion source output 12.

The time it takes for voltage at the HED or ion source outputs 14, 12 to switch from zero polarity or ground to a positive or negative polarity, or from a positive polarity to a negative polarity can vary depending on a number of factors, including but not limited to the components of the circuit 10. In some embodiments, the power supplies 20, 30 can be pre-charged such that changing the polarity of the voltage at the HED or ion source outputs 14, 12 can be near instantaneous, e.g., within 1 millisecond or less, because such polarity change occurs directly after the switches 50, 52, 54, 56 are changed from respective on-off configurations to provide positive and negative voltages to the outputs 14, 12. Further, in some embodiments, a HED and/or an ion source can charge from zero to an approximately constant voltage in about 1 millisecond to about 3 milliseconds, and in some embodiments a HED and/or an ion source can charge from an approximately constant voltage to an approximately constant voltage of an opposite polarity in about 1 millisecond to about 3 milliseconds for a HED and about 0.1 milliseconds to about 0.5 milliseconds for an ion source, although other charging times, including faster charging times, can be achieved. While polarity change can occur as quickly as one or more switches can be activated to change from providing a positive polarity to a negative polarity, or vice versa, it can take longer for ion response to occur. By way of non-limiting example, while a polarity of a HED 14 can be changed from positive to negative in less than 1 millisecond, ions may not arrive at the HED 14 until a longer period of time has elapsed, for example about 15 milliseconds, at least in part because the ions travel a distance along a path to arrive at the HED 14.

Figure 3:
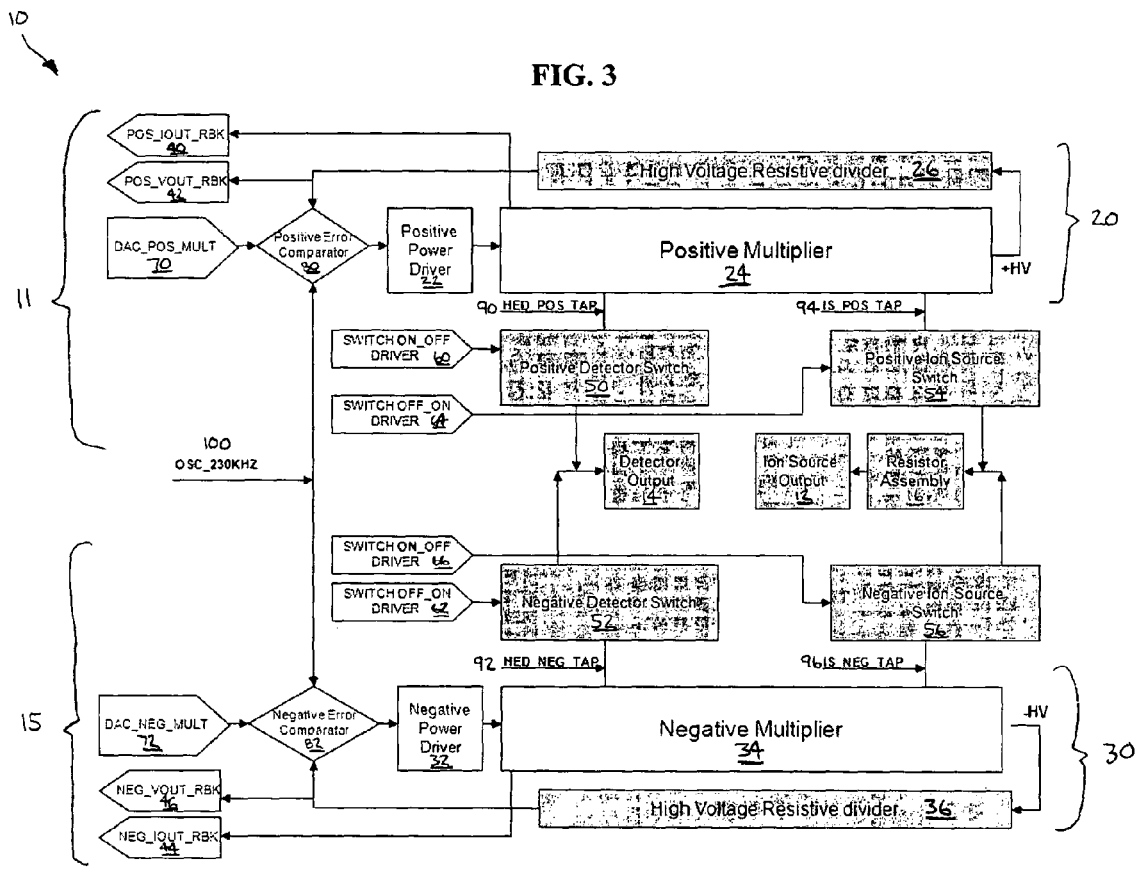
FIG. 3 is a block diagram of a circuit according to some embodiments of the applicants' teachings.

FIG. 3 provides additional circuitry that can be included as part of the circuit 10 of FIG. 2. As shown, the circuit 10 comprises the switches 50, 52, 54, 56, outputs 7, 9, 12, 14, and resistor assembly 16 of FIG. 2, and the power supplies 20, 30 of FIG. 2 are elaborated upon by separately illustrating the multipliers 24, 34 and drivers 22, 32. Additionally, FIG. 3 further comprises digital-to-analog converters (DACs) 70, 72, comparators 80, 82, resistive dividers 26, 36, switch drivers 60, 62, 64, 66, taps 90, 91, 92, 94, 95, 96, read back components 40, 42, 44, 46, and an input signal 100. As shown, in some embodiments the circuit 10 has a positive half 11 (the top half of the illustrated circuit) and a negative half 15 (the bottom half of the illustrated circuit).

In some embodiments, the input signal 100 can provide a single, oscillating signal, i.e., an alternating current (AC), which can be subsequently amplified to create the positive and negative voltages that are applied to the HED 14 and ion source 12. As shown, in this illustrative embodiment, the input signal 100 has a frequency of about 230 kHz, although frequencies across a wide range can be used in conjunction with the circuit 10, such as frequencies in the range of about 10 kHz to about 1000 kHz.

The input signal 100 can be applied to the respective positive and negative error comparators 80, 82, and subsequently to the power drivers 22, 32. The purpose and functionality of the comparators 80, 82 are discussed further below. The comparators 80, 82 can direct the signal to the respective positive and negative power drivers 22, 32, which can be configured to amplify the signal. In some embodiments, the signal at the power drivers 22, 32 can remain an AC current as it is amplified. The drivers can amplify the signal to a range of about ±10 V to about ±60 V, for instance about ±20 V, although other amplified voltages can be achieved, depending, at least in part, on the components of the circuit 10 and the desired voltage outputs.

The amplified signal can then be applied to the respective positive and negative multipliers 24, 34. The multipliers 24, 34 can be configured to further amplify the signal and/or convert the AC current to a direct current (DC). The multipliers 24, 34 can amplify the signal to a range of about ±2 kV to about ±24 kV, for instance about ±12.5 kV, although other amplified voltages can be achieved, depending, at least in part, on the components of the circuit 10 and the desired voltage outputs.

Once the amplitude of the signal reaches a maximum voltage threshold, the signal can exit the multipliers 24, 34 and can be applied to the respective high voltage resistive dividers 26, 36. The maximum voltage threshold can be in the range of about ±10 kV to about ±40 kV, for instance about ±20 kV, although other maximum threshold voltages can be achieved, depending, at least in part, on the components of the circuit 10 and the desired voltage outputs. The dividers 26, 36 can be configured to lower the voltage outputted by the multipliers

24, 34, thereby regulating the signal in the circuit 10. In some embodiments, the dividers 26, 36 can lower the signal to a range of about ±2 V to about ±8 V, for instance about ±5 V, although other lowered voltages can be achieved, depending, at least in part, on the components of the circuit 10 and the desired voltage outputs After the DC signal passes across the respective high voltage dividers 26, 36, the lowered voltage signal can be directed to the respective comparators 80, 82. Thus, the comparators 80, 82 can receive both the initial AC signal from the input signal and the DC signal that is created by the multipliers 24, 34 and lowered by the resistive dividers 26, 36. Further, the comparators 80, 82 can also receive a second DC signal input from the respective DACs 70, 72. The signal from the DACs 70, 72 can be in the range of about 0 V to about +5 V, and can be used to set a signal of about +0.1 kV to about +12 kV for the positive multiplier 24, and, for instance, a signal of about −0.1 kV to achieve about a −12 kV output for the negative multiplier 34, depending, for example, on a digital control signal applied to the DACs 70, 72 by a microcontroller (not illustrated). Based, at least in part, on the AC signal from the input signal 100, the first DC signal from the multipliers/dividers 24, 34/26, 36, and the second DC signal from the DACs 70, 72, the comparators 80, 82 can compare these values and subsequently adjust the amount of the AC signal that the comparators 80, 82 pass along to the respective power drivers 22, 32. Accordingly, the comparators 80, 82 can correct for errors in the multipliers' 24, 34 output signal. A person skilled in the art will recognize that other error correction or control algorithms can be used with the illustrated circuit 10.

The circuit can also comprise a plurality of taps 90, 92, 94, 96—two for the HED and two for the ion source. The taps 90, 92, 94, 96 can be pre-established threshold voltages that, once achieved, can cause the DC voltage from the multipliers 24, 34 to be directed to the respective outputs 12, 14 if the switch 50, 52, 54, 56 associated with the tap 90, 92, 94, 96 is turned on. As shown, the HED positive tap 90 can be wired between the positive multiplier 24 and the positive HED switch 50, the ion source positive tap 94 can be wired between the positive multiplier 24 and the positive ion source switch 54, the HED negative tap 92 can be wired between the negative multiplier 34 and the negative HED switch 52, and the ion source negative tap 96 can be wired between the negative multiplier 34 and the negative ion source switch 56. The threshold value for each of the taps 90, 92, 94, 96 can be different. For example, the threshold value of the HED taps 90, 92 can be larger than the threshold value of the ion source taps 94, 96. Further, the absolute values of the threshold values of the positive and negative HED taps 90, 92 can be unequal, as can the absolute values of the threshold values of the positive and negative ion source taps 94, 96. Accordingly, in some embodiments threshold tap voltages 90, 92 for the HED 14 can be in the range of about ±8 kV to about ±20 kV, for example about ±12.5 kV, and threshold tap voltages for the ion source 12 can be in the range of about ±2 kV to about ±10 kV, for example about −4.8 kV and about +6 kV, although other values of the threshold voltage taps 90, 92, 94, 96 can be achieved, depending, at least in part, on the components of the circuit 10. The timing of the system can be improved by taking different tap voltages at each of the taps 90, 92, 94, 96, for instance when a desired positive voltage of an ion source is about +5.5 kV, a desired negative voltage of an ion source is about −4.5 kV, a desired positive voltage of a HED is about +12 kV, and a desired negative voltage of a HED is about −12 kV.

Even if the voltage of the multipliers 24, 34 exceeds the respective taps 90, 92, 94, 96, the voltage may only be passed along to the HED and ion source outputs 14, 12 if the respective switch 50, 52, 54, 56 is turned on. The drivers 60, 62, 64, 66 of the respective switches 50, 52, 54, 56 are shown in FIG. 3. As discussed above with respect to FIG. 2, although in this illustrated embodiment each switch 50, 52, 54, 56 has its own driver 60, 62, 64, 66, in other embodiments, the drivers 60, 62, 64, 66 can be consolidated into a single driver or two drivers that are linked such that driving one switch to be on or off can drive the other switches to also be on or off based on the desired set-up. By way of non-limiting example, and as illustrated in FIG. 3, if the driver 60 of the positive HED switch 50 is on, thus driving the positive HED switch 50 to also be on, the driver 64 of the positive ion source switch 54 and the driver 62 of the negative HED switch 52 can be switched off while the driver 66 of the negative ion source switch 56 can be on. Such a configuration can be referred to as the negative ion mode. An opposite configuration in which the positive HED switch and negative ion source switch are in an off configuration and the negative HED switch and positive ion source switch are in an on configuration can be referred to as the positive ion mode. As discussed with respect to FIG. 2, in some embodiments a microcontroller (not shown) can be electrically connected to the circuit 10 and configured to power and control the various components of the circuit 10, including but not limited to the drivers 22, 32, multipliers 24, 34, switches 50, 52, 54, 56, switch drivers 60, 62, 64, 66, taps 90, 92, 94, 96, DACs 70, 72, comparators 80, 82, and read back components 40, 42, 44, 46 (discussed below).

As shown, in some embodiments in which one or more detector float outputs 7, 9 are provided, the one or more detector float outputs 7, 9 can also be associated with taps 91, 95. The taps 91, 95 can operate in a manner similar to the taps described above with respect to taps 90, 92, 94, and 96, and thus the taps 91, 95 can be pre-established threshold voltages that, once achieved, can cause the DC voltage from the multipliers 24, 34 to be directed to the respective outputs 7, 9. The taps 91, 95 can be associated with one or more switches (not shown) such that if the threshold voltage is achieved, the DC voltage from the multipliers 24, 34 can be provided when the switch is turned on. The threshold value for the taps 91, 95 can be different. For example, the threshold value of the positive detector float tap 91 can be larger than the threshold value of the negative detector float tap 95, and/or any of the other float tap 90, 92, 94, 96 values. Further, the absolute values of the threshold values of the positive and negative float taps 91, 95 can be unequal with respect to each other and/or any of the other float taps 90, 92, 94, 96 values. Accordingly, in some embodiments threshold tap voltages 91 for the positive detector float output 7 can be in the range of about 0 kV to about +8 kV, for example about +5 kV, and threshold tap voltages for the negative detector float output 9 can be in the range of about 0 kV to about −8 kV, for example about −5 kV, although other values of the threshold voltage taps 91, 95 can be achieved, depending, at least in part, on the components of the circuit 10.

In some embodiments, the HED output 14 and the detector float outputs 7, 9 can be provided such that the HED output 14 and the detector float outputs 7, 9 can be derived at the same time from the same multiplier 24, 34. By way of non-limiting example, in some embodiments in which the system operates in a negative ion mode, the positive multiplier 24 can produce a voltage for the positive detector float output 7 that is about +5 kV, while the negative HED switch 52 can be turned on such that the HED output 14 is set to a potential in the range of about −500 V to about −1000 V. Accordingly, negative ions from the ion source can go directly to the detector (not shown) and the HED 14 can be used as a deflector to adjust ion trajectories into the detector. Further, in some embodiments in which the system operates in a positive ion mode, the positive multiplier 24 can produce a voltage for the positive detector float output that is about +5 kV, while the negative HED switch 52 can be turned on such that the HED output 14 is set to a high potential of about −12 kV. As a result, the ions from the ion source can go to the HED 14, and the HED 14 can produce electrons that can then go to the detector (not shown). Switching between the negative ion mode and the positive ion mode can occur quickly because the positive detector float output 7 can remain the same in each instance. In some embodiments, the detector can be floated with a negative potential, such that the detector float output 9 is established at a desired value, the HED 14 can be at a positive voltage and operate as a deflector to adjust the ion trajectories into the detector (not shown). In some embodiments, the HED 14 can be part of the detector itself such that the detector comprises the HED 14 and other components, while in some embodiments the HED 14 can be disposed upstream from the detector. This can be done, for example, to compare detection efficiencies.

In some embodiments, one or more read back components 40, 42, 44, 46 can be provided, for instance to provide feedback about the performance of the system. The read back components 40, 42, 44, 46 can measure one or more parameters of the system and the measured signal can be converted for display, for instance by using firmware to display results on a screen or a print-out. As shown, in some embodiments, read back components can comprise a positive current read back 40, a positive voltage read back 42, a negative current read back 44, and a negative voltage read back 46, although other parameters can be associated with read backs. Further, the read backs 40, 42, 44, 46 can be placed anywhere in the circuit 10 to provide the desired feedback, but as shown, in some embodiments the positive and negative current read backs 40, 44 can be associated with the multipliers 24, 34, respectively, and the positive and negative voltage read backs 42, 46 can be associated with the signal passed from the resistive dividers 26, 36 to the comparators 80, 82, respectively. Based on the placement of the read back components 40, 42, 44, and 46 as shown, feedback related to the circuit 10 can be provided before the voltage is multiplied and/or converted to a DC voltage by the multipliers 24, 34, and after the voltage output by the multipliers 24, 34 has been lowered by the resistive dividers 26, 36. In some embodiments, a voltage associated with the read back components 40, 42, 44, 46 can be a dc voltage and can be directed to a microcontroller (not shown).

In some embodiments of the circuit 10, the power supplies 20, 30 can operate in at least two modes—a current mode and a voltage mode. In a current mode, the current output level is set by the same DAC 70, 72 that supplied the voltage feedback to the circuit 10. The level of current in the circuit 10 can be measured, for example, by an adequate resistor value. The current can be read and controlled by either the positive current read back component 40 or the negative current read back component 44. The voltage can be set to the maximum possible value by the multipliers 24, 34 at the beginning of the process while the current loop can wait for the ion source to initiate a discharge, which can result in a high voltage output. Once a high voltage discharge is initiated in the circuit 10, the current loop can start to regulate its value through a current feedback component 48, which in some embodiments can be an active potentiometer. At the same time, high voltages passed from the multipliers 24, 34 to the resistive dividers can start to drop to maintain the current at a steady set point. Accordingly, the current value can be kept constant and the voltage can be variable. Conversely, in a voltage mode, a current can be variable and an output voltage can be maintained by the loop feedback at a fixed value. By way of non-limiting example, the positive or negative multiplier 24, 34 turned on for the ion source can work in current mode while the other of the positive or negative multiplier 24, 34 turned on for the HED can work in voltage mode. In some embodiments, operation between the voltage mode and the current mode can be controlled by one or more switches.

At least one benefit that results from the applicants' teachings is that the number of components used in the system for supplying voltages to the ion source and the HED of a mass spectrometer can be significantly reduced relative to conventional systems. For example, in conventional systems, four power supplies are typically used to power the ion source and the HED—one for supplying positive voltage to the ion source, one for supplying negative voltage to the ion source, one for supplying positive voltage to the HED, and one for supplying negative voltage to the HED. As shown, applicants' teachings allow for only two power supplies 20, 30 to power the same four power options. Other components of the system are also reduced, for example, the number of DACs 70, 72. While in some embodiments the number of some components can increase, for example the number of switches, a cost saving benefit can exist because the cost of switches can be significantly less than the cost of power supplies and/or DACs. Further, in some embodiments, by reducing the number of components such as power supplies and DACs, the accuracy can be improved and the failure rate reduced, at least because the number of components subject to accuracy errors and failure can be reduced.

Aspects of the applicants' teachings may be further understood in light of the following example, which should not be construed as limiting the scope of the applicants' teachings in any way. FIGS. 4A-4D provides more details about the circuitry that can be included as part of the circuit of FIGS. 2 and 3. As shown, the circuit comprises each of the components illustrated with respect to the circuit of FIGS. 2 and 3 but with more detail. A person having skill in the art would understand how to read the schematic representations of the circuitry provided in FIGS. 4A-4D, and thus the components of the circuit 10 are only generally described herein. Further, although a variety of values are provided in FIGS. 4A-4D, for example input and output voltages and resistance values, such values are in no way limiting of the scope of the applicants' teachings in any way. The values merely provide one, non-limiting example from which those skilled in the art can use to follow along the path of the circuitry across the four figures.

Figure 4A:
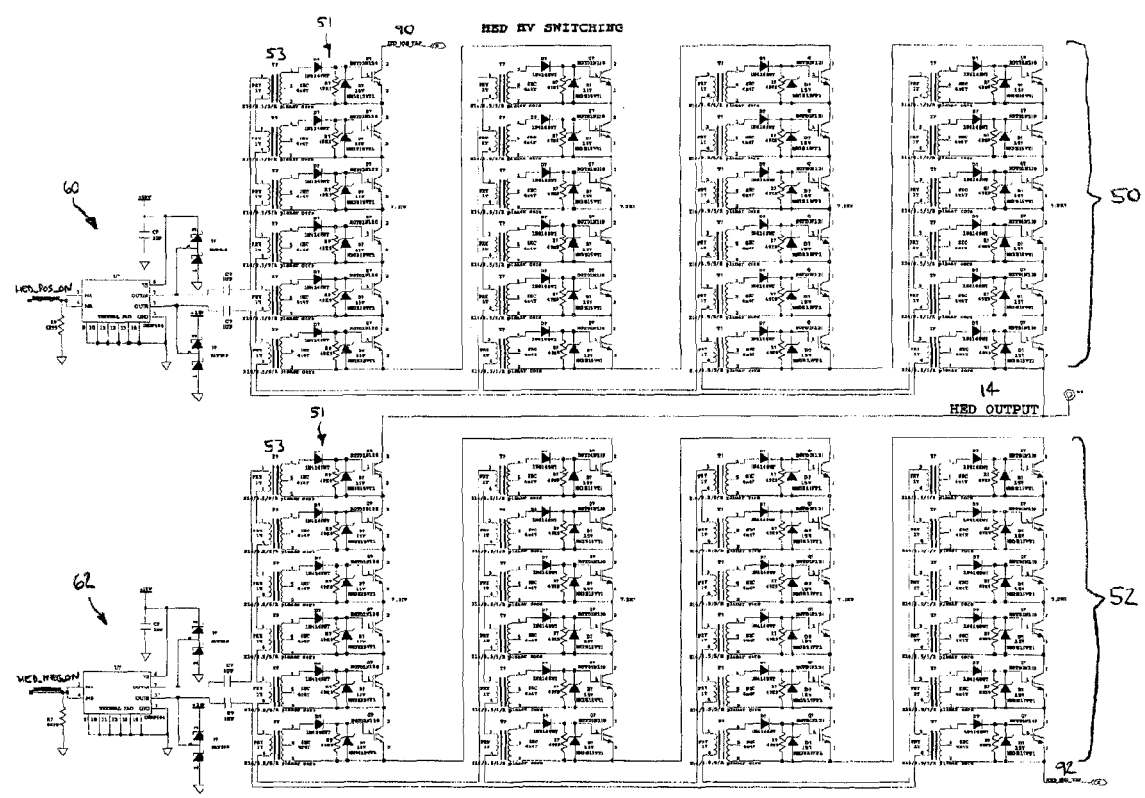
FIG. 4A is a schematic representation of a first portion of a circuit according to some embodiments of the applicants' teachings.

FIG. 4A comprises the positive and negative HED switches 50, 52, the respective drivers 60, 62 of the positive and negative HED switches 50, 52, the HED positive and negative taps 90, 92, and the HED output 14. In some embodiments, the positive and negative HED switches 50, 52 can comprise a plurality of switches 51. As shown in FIG. 4A, in some embodiments, 24 switches 51 can be used to form the positive HED switch 50 and 24 switches 51 can be used to form the negative HED switch 52, although any number of switches 51 can be used, depending, at least in part, on the components of the circuit 10 and the desired HED output 14. As shown, in some embodiments, the switches 51 can comprise isolated gate bipolar transistors 53 that can be turned on and off by the drivers 60, 62 of the positive and negative HED switches 50, 52. A person skilled in the art will understand that other embodiments of switches can also be used to form the switches 50, 52, and that the circuitry of the switches 51 illustrated is in no way limiting of applicants' teachings for switching generally.

In the illustrated embodiment, the drivers 22, 32 and the multipliers 24, 34 (shown in FIGS. 4C and 4D) can power, via the HED positive and negative taps 90, 92, the switches 50, 52 such that each switch 51 can produce a voltage of about ±1 kV. Thus, the resulting voltage across all of the switches 50, 52 in the illustrated embodiment can be about ±20 kV, which in turn can result in a voltage output of about ±12 kV, depending, at least in part, on the other components of the circuit 10. A person skilled in the art will recognize that only one of the two switches 50, 52 may operate at a time. Thus, if it is desired to have a positive HED output 14, then the positive HED switch 50 and associated circuitry may be on while the negative HED switch 52 and associated circuitry may be off. Likewise, if it is desired to have a negative HED output 14, then the negative HED switch 52 and associated circuitry may be on while the positive HED switch 50 and associated circuitry may be off.

Figure 4B:
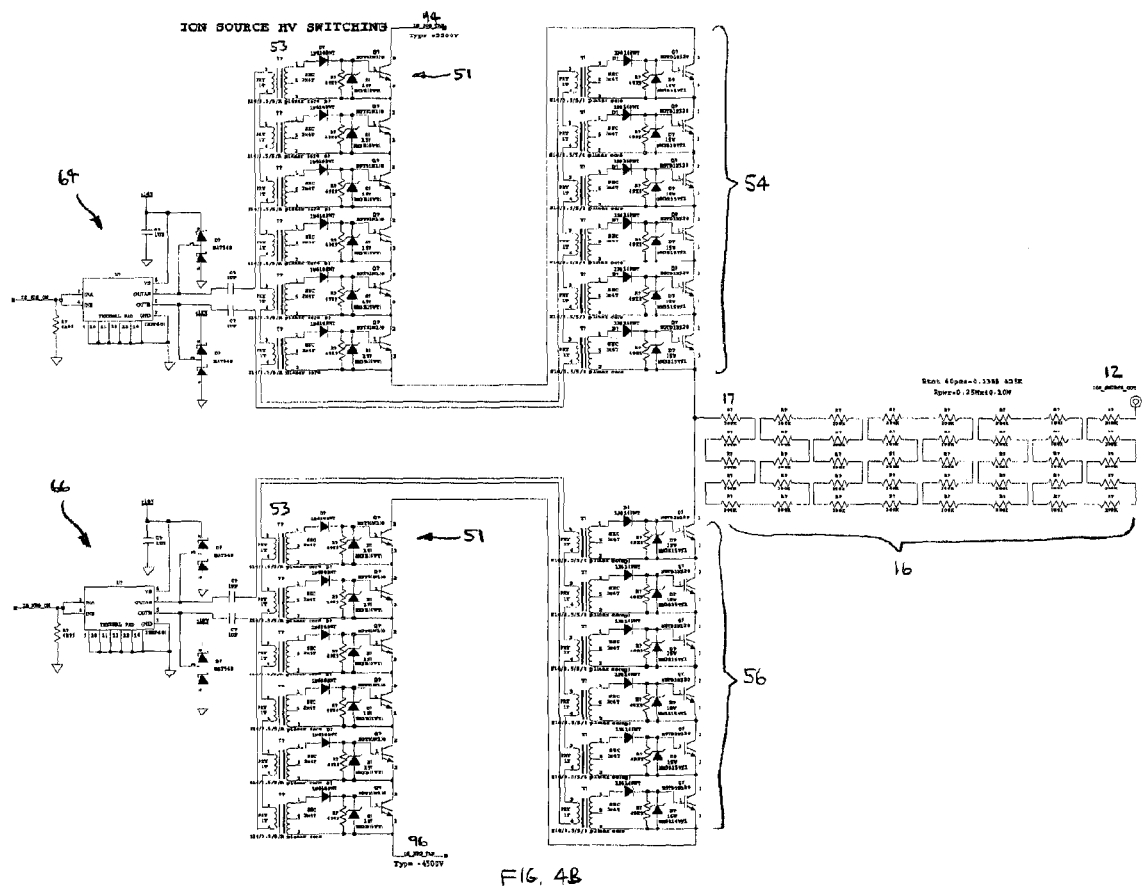
FIG. 4B is a schematic representation of a second portion of a circuit according to some embodiments of the applicants' teachings.

FIG. 4B comprises the positive and negative ion source switches 54, 56, the respective drivers 64, 66 of the positive and negative ion source switches 54, 56, the ion source positive and negative taps 94, 96, the resistor assembly 16, and the ion source output 12. FIG. 4B is similar to FIG. 4A, however, in some embodiments, at least one difference can be that the number of switches 51 used to form the positive and negative ion source switches 54, 56 can be less than the number of switches 51 used to form the positive and negative HED switches 50, 52. As shown in FIG. 4B, 12 switches 51 can be used to form each of the positive and negative ion source switches 54, 56. This can be because, in some embodiments, the absolute value of the voltage applied to the ion source 12 can be less than the absolute value of the voltage applied to the HED 14. Accordingly, in the illustrated embodiment, the drivers 22, 32 and multipliers 24, 34 (shown in FIGS. 4C and 4D) can power, via the ion source positive and negative taps 94, 96, the switches 54, 56 such that each switch 51 can produce a voltage of about ±1 kV, and the resulting voltage across all of the switches 54, 56 can be about ±10 kV. In other words, because half the number of switches 51 are used for the ion source 12 in comparison to the HED 14, the output voltage to the ion source 12 can be about half as much as the output voltage to the HED 14. Again, a person skilled in the art will recognize that only one of the two switches 54, 56 may operate at a time. Thus, if it is desired to have a positive ion source output 12, then the positive ion source switch 54 and associated circuitry may be on while the negative ion source switch 56 and associated circuitry may be off. Likewise, if it is desired to have a negative ion source output 12, then the negative ion source switch 56 and associated circuitry may be on while the positive ion source switch 54 and associated circuitry may be off.

In some embodiments, a resistor assembly 16 can be electrically coupled between the ion source switches 54, 56 and the ion source output 12. The resistor assembly 16 can help control impedance such that the impedance of the plurality of switches 54, 56 approximately matches the impedance of the ion source output 12. The resistor assembly 16 can comprise any number of resistors, in any value combination, depending at least in part on the desired resistance, other components of the circuitry, and the desired voltage outputs, but as shown, in some embodiments the resistor assembly 16 can comprise about 40 resistors 17, each having a resistance of about 200 kΩ for a total resistance of about 8 MΩ. In some other embodiments, a resistance of about 8 MΩ (or any other value so desired) can be achieved by a single resistor having a resistance of about 8 MΩ (or any other value so desired), or any other combination of resistors based, at least in part, on the number of resistors and the resistance value of the resistors. Further, in some embodiments, other components can be used to provide resistance in addition to or in lieu of the resistor assembly 16.

Figure 4C:
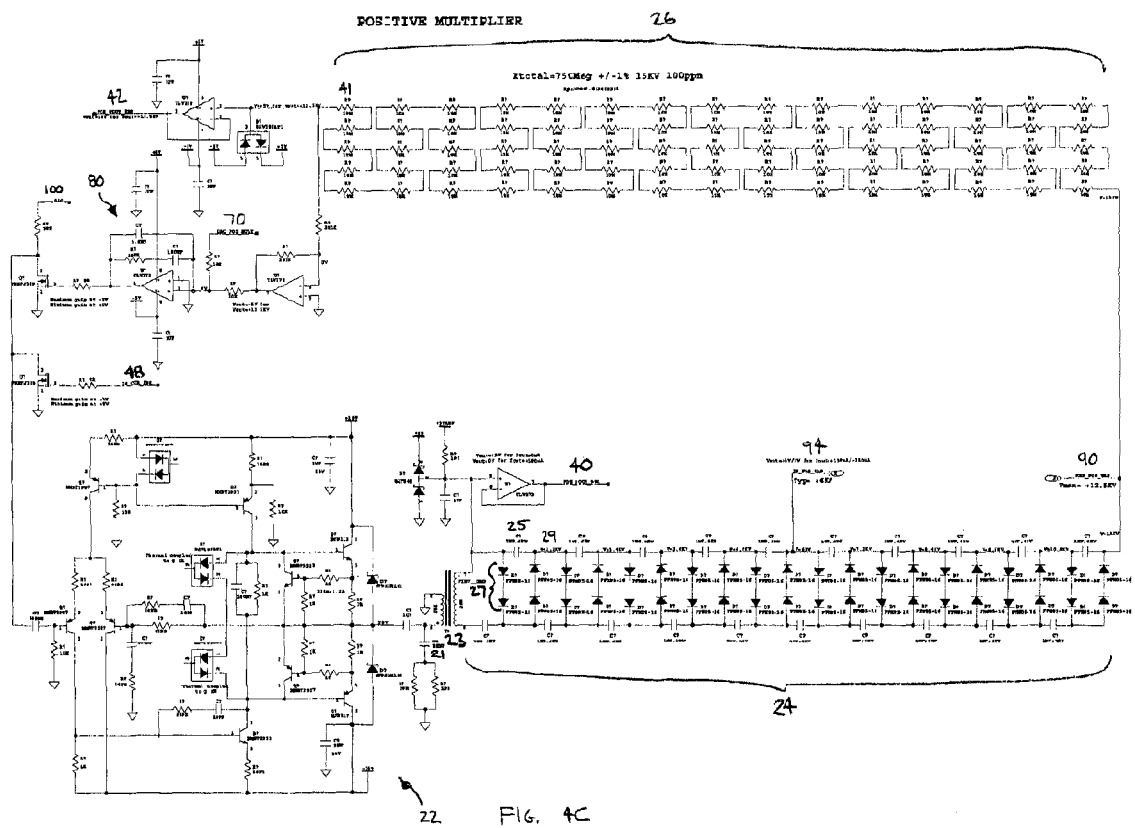
FIG. 4C is a schematic representation of a third portion of a circuit according to some embodiments of the applicants' teachings.
Figure 4B:
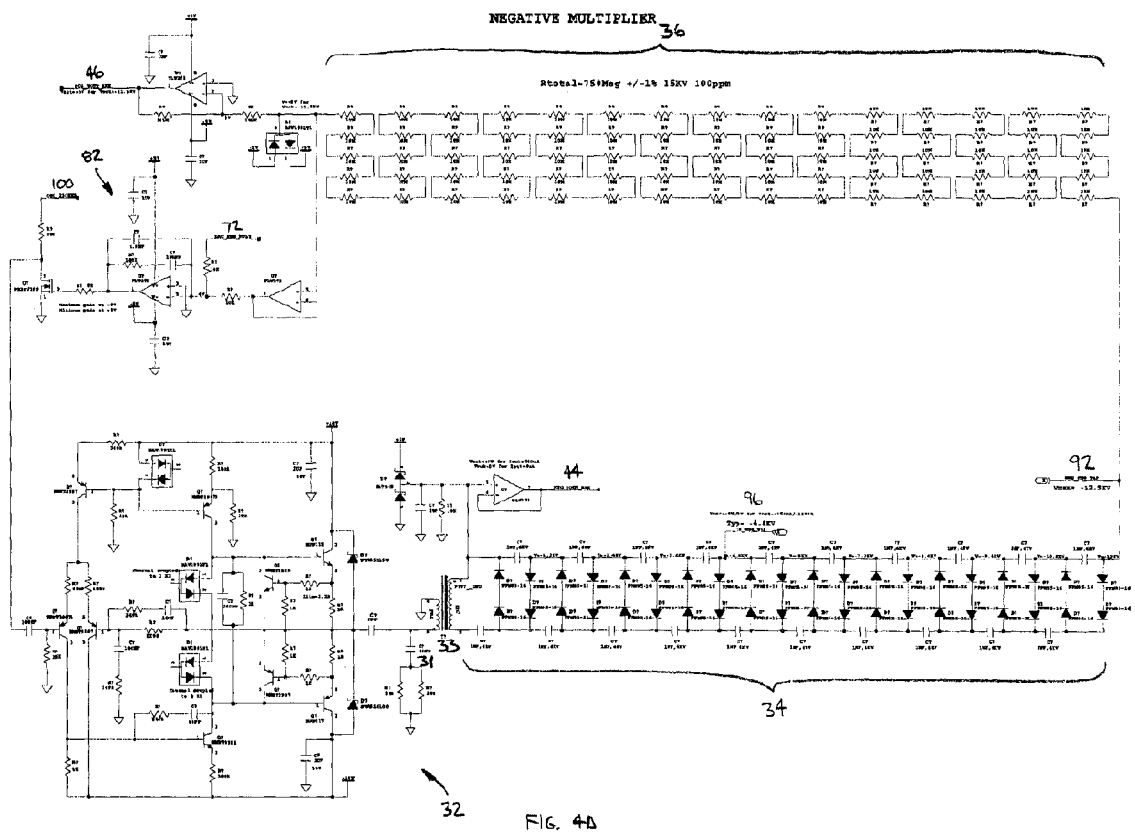

FIG. 4C comprises the input signal 100 supplied from, for example, an oscillator (not shown), the positive error comparator 80, the positive DAC 70, the positive power driver 22, the positive multiplier 24, the high voltage resistive divider 26, the positive current read back component 40, the positive voltage read back component 42, the current feedback component 48, the positive HED tap 90, and the positive ion source tap 94. As described above with respect to FIG. 3, the input signal 100 can be applied to the positive comparator 80 and be subsequently directed to the positive power driver 22. The driver 22 can comprise circuitry to allow the signal to be amplified, which can comprise a decoupling capacitor 21 configured to pass the signal from the driver 22 to the multiplier 24 via a transformer 23. The positive current read back component 40 can sample the signal after it makes its way to the multiplier 24 to check that the system is working properly.

As the signal passes across the multiplier 24, the voltage of the signal can be multiplied. More particularly, the multiplier 24 can comprise a plurality of capacitors 25 and diodes 27 that are configured to amplify the signal. As shown, in the illustrated embodiment, after each diode-capacitor stage 29, the signal can be amplified by about +1.2 kV, and thus after 10 stages, the amplified signal can be about +12 kV. As further shown, in the illustrated embodiment, when the positive multiplier 24 reaches about +6 kV, the ion source positive tap 94 can be engaged such that power may be provided to the ion source 12 if the positive ion source switch 54 (not shown) is on. Likewise, when the positive multiplier 24 reaches about +12 kV, the HED positive tap 90 can be engaged such that power may be provided to the HED 14 if the positive HED switch 50 (not shown) is on. Further, because in the illustrated embodiment the maximum threshold voltage can be about +12 kV, the signal can also be directed to the high voltage resistive divider 26.

The high voltage resistive divider 26 can help regulate the circuit 10 by lowering the signal that can eventually be fed into the positive error comparator 80. The divider 26 can comprise any number of resistors, depending at least in part on the desired resistance, other components of the circuitry, and the desired voltage to be fed into the positive error comparator, but as shown, in some embodiments the divider can comprise about 75 resistors 41, each having a resistance of about 10 MΩ for a total resistance of about 750 MΩ. In some other embodiments, a resistance of about 750 MΩ (or any other value so desired) can be achieved by a single resistor having a resistance of about 750 MΩ (or any other value so desired), or any other combination of resistors based, at least in part, on the number of resistors and the resistance value of the resistors. Further, in some embodiments, other components can be used to provide resistance in addition to or in lieu of resistors.

The positive voltage read back component 42 can sample the signal after it passes across the divider 26 to check that the system is working properly. Further, as discussed above with respect to FIG. 3, the signal can also be fed back into the positive error comparator 80, along with the signal from the positive DAC 70, so that the comparator 80 can compare the values of the input signal 100, the signal from the high voltage resistive divider 26, and the signal from the positive DAC 70 to regulate the amount of the input signal 100 that can be passed along to the positive power driver 22.

Similarly, FIG. 4D comprises the input signal 100, the negative error comparator 82, the negative DAC 72, the negative power driver 32, the negative multiplier 34, the high voltage resistive divider 36, the negative current read back component 44, the negative voltage read back component 46, the negative HED tap 92, and the negative ion source tap 96. The components 31 and 33 are similar to the components 21 and 23, respectively, found in FIG. 4C. The operation of the circuitry illustrated in FIG. 4D is similar to that described with respect to FIG. 4C and also understood by a person skilled in the art, and thus each of the components is not described in further detail. Together, the portions of the circuit of FIGS. 4A-4D can operate to control a mass spectrometer system such that a HED can be powered at an opposite polarity as an ion source, or components of the HED and/or ion source, while using only two power supplies.

Figure 5:
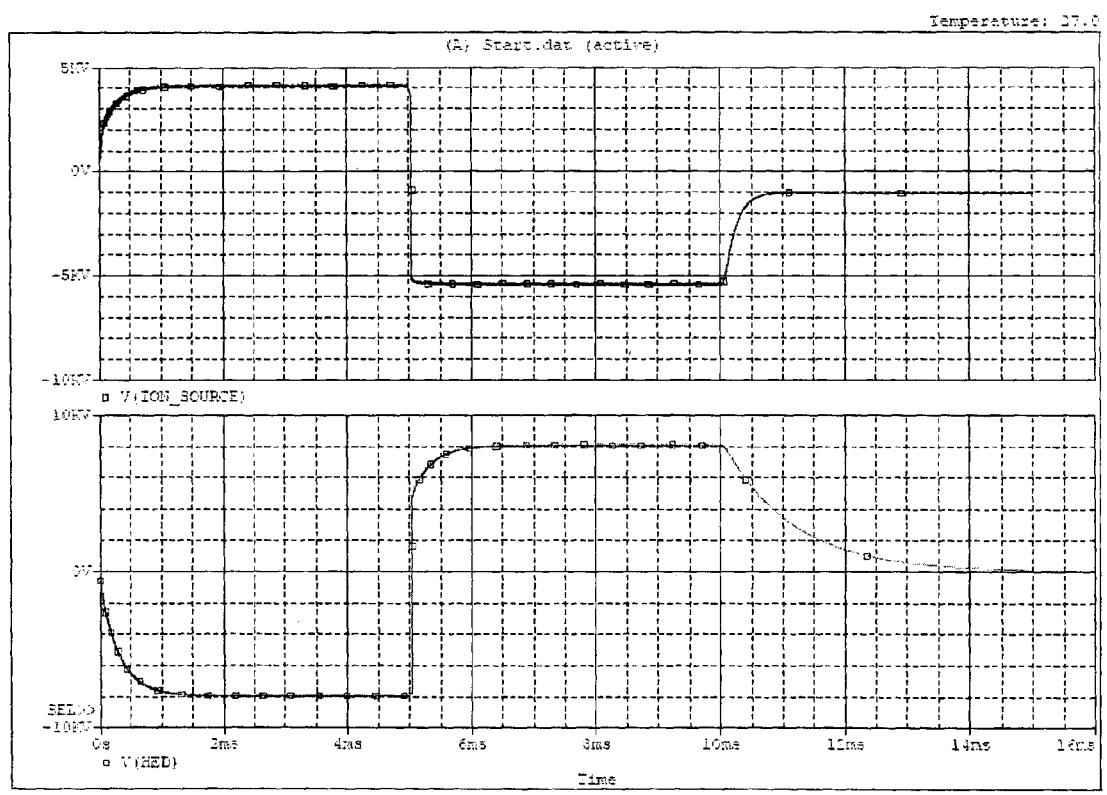
FIG. 5 is a plot of a voltage response as it relates to time for the circuit of FIG. 4.

Aspects of the applicants' teachings may be further understood in light of the following example, which should not be construed as limiting the scope of the applicants' teachings in any way. FIG. 5 illustrates a simulation of the circuit 10 of FIGS. 4A-4D using Cadence® Pspice®. As illustrated, a top half of the plot represents the charging voltage and time for an ion source and the bottom half of the plot represents the charging voltage and time for a HED. The plot for the ion source indicates that the system can charge to a substantially constant, positive voltage of about +4 kV after being off in about 1 millisecond, and can then be switched from a positive voltage to a substantially constant, negative voltage of about −5.5 kV in about 0.1 milliseconds. As further shown, after the system is turned off, the ion source can discharge back toward 0 kV (actually about −1 kV) in about 1 millisecond.

The plot for the HED indicates that the system can charge to a substantially constant, negative voltage of about −8 kV after being off in about 1 millisecond, and can then be switched from a negative voltage to a substantially constant, positive voltage of about +8 kV in about 1 millisecond. The speed at which the polarity of voltage applied to ion sources and HEDs can be switched can be expedited by keeping the multipliers charged such that the polarity switch is achieved by changing which switches are on and off so as to change which multiplier is applying a voltage to which output. As further shown, after the system is turned off, the HED can discharge back toward 0 kV in about 4 milliseconds. These plots illustrate just how quickly the polarities can be switched in view of applicants' teachings. However, a person skilled in the art will recognize that as the parameters of the circuit 10 are changed, so too will the numeric results. Regardless of the numeric results, the circuit 10 provides the ability to quickly switch between dual polarities that remain at a substantially constant and substantially high voltage.

The systems, devices, circuits, and methods described herein can be used in conjunction with many different mass spectrometry systems. While FIG. 1 provides a general framework of some mass spectrometers with which applicants' teachings can be used, a person skilled in the art will recognize many different types and set-ups of mass spectrometers with which applicants' teachings can be used. By way of non-limiting examples, various types of quadrupole and time-of-flight mass spectrometers can be used in conjunction with applicants' teachings, such as hybrid quadrupole/time-of-flight mass spectrometers (QqTOF), single-stage or standalone time-of-flight mass spectrometers (TOF), dual-stage or tandem time-of-flight mass spectrometers (TOF-TOF), hybrid trap/time-of-flight mass spectrometers (Trap-TOF), hybrid linear ion trap/quadrupole mass spectrometers (Trap-Qq), quadrupole mass spectrometers comprising detectors having discrete dynode electron multipliers, quadrupole mass spectrometers comprising detectors having continuous dynode electron multipliers, mass spectrometers having other time-of-flight topologies, and mass spectrometers having other detector and quadrupole set-ups. Some non-limiting examples of other embodiments of mass spectrometers, or components thereof that can be used in association with applicants' teachings can be found in U.S. patent application Ser. No. 61/332,387 and its subsequent PCT Application No. PCT/IB11/00972, entitled "Triple Switch Topology for Delivering Ultrafast Pulser Polarity Switching for Mass Spectrometry," filed May 7, 2010 and May 6, 2011, respectively, PCT Application No. PCT/IB11/01905, entitled "Method and System for Increasing the Dynamic Range of Ion Detectors," and filed on Aug. 18, 2011, and U.S. Pat. No. 7,923,681, entitled "Collision Cell for Mass Spectrometer," which are hereby incorporated by references in their entireties.

Further, although the circuitry of FIGS. 2-4D is described with respect to mass spectrometers in which a HED and an ion source are at opposite polarities, the applicants' teachings can be applied to any number of components of a mass spectrometer. Still further, applicants' teachings are in no way limited to use with mass spectrometers. Applicants' teachings can be applied to any system in which positive and negative voltages are applied, including systems using high positive and negative voltages and systems in which the positive and negative voltages are applied approximately simultaneously. The ability to quickly switch polarities with dual outputs can have many different applications in many different fields.

While the above description provides examples and specific details of various embodiments, it will be appreciated that some features and/or functions of the described embodiments admit to modification without departing from the scope of the described embodiments. The above description is intended to be illustrative of the invention, the scope of which is limited only by the language of the claims appended hereto. For example, while the teachings herein are described in conjunction with various embodiments, it is not intended that such teachings be limited to such embodiments. On the contrary, the teachings herein encompass various alternatives, modifications, and equivalents, as will be appreciated by those of skill in the art. All publications and references cited herein are expressly incorporated herein by reference in their entirety.

The invention claimed is:

1. A mass spectrometer system, comprising:
an ion source;
a detector configured to receive at least a portion of ions generated by the ion source;
a positive multiplier configured to provide a positive voltage to each of the ion source and the detector;
a negative multiplier configured to provide a negative voltage to each of the ion source and the detector; and
one or more switches for controlling application of voltage to the detector and the ion source that allows the switching of the positive voltage between the ion source and the detector and to allow the switching of the negative voltage between the ion source and the detector;
wherein the one or more switches comprises a first switch configured to allow the positive multiplier to supply the positive voltage to the ion source when the negative multiplier supplies the negative voltage to the detector, and to allow the positive multiplier to supply the positive voltage to the detector when the negative multiplier supplies the negative voltage to the ion source.

2. The mass spectrometer system of claim 1, wherein the voltage provided by at least one of the positive multiplier and the negative multiplier is in the range of about ±1 kV to about ±20 kV.

3. A mass spectrometer system, comprising:
an ion source;
a detector configured to receive at least a portion of ions generated by the ion source; and
one or more switches coupled to one or more power supplies, the one or more switches being configured to allow a positive voltage to be supplied to the ion source while a negative voltage is supplied to the detector and further configured to allow a negative voltage to be supplied to the ion source while a positive voltage is supplied to the detector;
a voltage input configured to receive voltage supplied to the ion source and the detector that is supplied by the same power supply; and
wherein the positive voltage supplied to the ion source and the detector is supplied by a first, positive multiplier, and the negative voltage supplied to the ion source and the detector is supplied by a second, negative multiplier.

4. The mass spectrometer system of claim 3, wherein the one or more switches further comprises:
a first switch for controlling application of the positive voltage to the ion source or the detector; and
a second switch for controlling application of the negative voltage to the ion source or the detector;
wherein the first switch is configured to allow the positive voltage to be applied to the ion source, the second switch is configured to allow the negative voltage to be applied to the detector, the first switch is further configured to allow the positive voltage to be applied to the detector, and the second switch is further configured to allow the negative voltage to be applied to the ion source.

5. The mass spectrometer system of claim 4, wherein the first switch further comprises an ion source positive voltage switch and a detector positive voltage switch and the second switch further comprises an ion source negative voltage switch and a detector negative voltage switch.

6. The mass spectrometer system of claim 3, wherein the one or more switches further comprises:
a first switch for controlling application of the positive voltage or the negative voltage to an ion source; and
a second switch for controlling application of the positive voltage or the negative voltage to a detector;
wherein the first switch is configured to allow the positive voltage to be applied to the ion source, the second switch is configured to allow the negative voltage to be applied to the detector, the first switch is configured to allow the negative voltage to be applied to the ion source, and the second switch is further configured to allow the positive voltage to be applied to the detector.

7. The mass spectrometer system of claim 6, wherein the first switch further comprises an ion source positive voltage switch and an ion source negative voltage switch and the second switch further comprises a detector positive voltage switch and a detector negative voltage switch.

8. The mass spectrometer system of claim 3, wherein the first and second switches are capable of switching a polarity of voltage supplied to the ion source and a polarity of voltage supplied to the detector in a period of time that is less than or equal to about 1 millisecond.

9. The mass spectrometer system of claim 3, wherein the detector comprises a high energy conversion dynode.

10. The mass spectrometer system of claim 3, further comprising a mass analyzer disposed downstream of the ion source and upstream of the detector, the mass analyzer being configured to receive the portion of ions discharged from the ion source, and further configured to discharge the at least a portion of ions to the detector.

11. A method for detecting ions in a mass spectrometer, comprising:
operating an ion source to supply a plurality of ions; and
operating a detector to detect at least some ions of the plurality of ions;
wherein a polarity of voltage supplied to the ion source is opposite of a polarity of voltage supplied to the detector; and
wherein a positive voltage supplied to the ion source and the detector, and a negative voltage supplied to the ion source and the detector are supplied by the same power supply, and one or more switches are operated to switch the positive and negative voltages between the ion source and the detector.

12. The method of claim 11, further comprising:
switching an output of the power supply from powering the ion source to powering the detector.

13. The method of claim 12, wherein switching an output of the power supply further comprises:
switching an output of a positive voltage from the power supply from powering the ion source to powering the detector; and
switching an output of a negative voltage from the power supply from powering the detector to powering the ion source; and
wherein the period of time it takes to switch a polarity of voltage supplied to the ion source and a polarity of voltage supplied to the detector is less than or equal to about 1 millisecond.

14. The method of claim 11, further comprising:
supplying an alternating current signal to a control system of the mass spectrometer;
operating a multiplier to convert the alternating current signal to a first direct current signal;
operating a comparator to compare the alternating current signal prior to conversion to the first direct current signal and to a second direct current signal;
operating the comparator to adjust an amount of the alternating current supplied to the multiplier based on comparisons made by the comparator.

15. The method of claim 11, further comprising operating a mass analyzer to selectively discharge the at least some ions of the plurality of ions to the detector.

16. The method of claim 11, further comprising operating a microcontroller to switch the polarity of voltage supplied to the ion source and the polarity of voltage supplied to the detector.

* * * * *